United States Patent [19]

Mauro

[11] Patent Number: 6,001,205
[45] Date of Patent: Dec. 14, 1999

[54] POLYTETRAFLUOROETHYLENE COUPLED ARTICLES WITH SUBSTRATA

[75] Inventor: Gastone Mauro, Milan, Italy

[73] Assignee: Ausimont S.p.A., Milan, Italy

[21] Appl. No.: 08/942,620

[22] Filed: Oct. 2, 1997

[30] Foreign Application Priority Data

Oct. 4, 1996 [IT] Italy .................................. MI96A2049

[51] Int. Cl.$^6$ ............................ B29C 65/00; B29C 65/70
[52] U.S. Cl. ......................... 156/153; 156/315; 156/333; 428/421; 428/422
[58] Field of Search ..................................... 428/421, 422; 156/333, 315, 153, 242, 245, 308.2

[56] References Cited

U.S. PATENT DOCUMENTS

| | | | |
|---|---|---|---|
| 2,984,599 | 5/1961 | Edwards et al. ......................... | 156/333 |
| 3,421,972 | 1/1969 | Cromwell et al. .................. | 428/422 X |
| 3,799,832 | 3/1974 | Reick . | |
| 4,031,286 | 6/1977 | Seymus . | |
| 4,049,863 | 9/1977 | Vassiliou . | |
| 4,252,859 | 2/1981 | Concannon et al. . | |
| 4,259,463 | 3/1981 | Moggi et al. . | |
| 4,482,476 | 11/1984 | Yoshimura et al. ..................... | 252/511 |
| 4,546,141 | 10/1985 | Gebauer . | |

FOREIGN PATENT DOCUMENTS

| | | |
|---|---|---|
| 764537 | 10/1966 | Canada . |
| 0 012 434 | 6/1980 | European Pat. Off. . |
| 0 144 147 | 6/1986 | European Pat. Off. . |
| 0633257 | 1/1995 | European Pat. Off. . |
| 0683149 | 11/1995 | European Pat. Off. . |
| 0684276 | 11/1995 | European Pat. Off. . |
| 2 084 590 | 4/1982 | United Kingdom . |
| 9620982 | 7/1996 | WIPO . |

OTHER PUBLICATIONS

XP–002065666; JP57 163 524 A (Mitsui Fluorochemical Co. Ltd); Database WPI; Section Ch, Week 8246, Derwent Publications Ltd., London, GB; Class A14, AN 82–98379E.

*Primary Examiner*—Jeff H. Aftergut
*Attorney, Agent, or Firm*—Nikaido Marmelstein Murray & Oram, LLP

[57] ABSTRACT

Process to adhere PTFE in film or in sheets adhere to metal or plastic substrata which comprises:

1) making the substratum surface rough by sandblasting;
2) spreading on a PTFE sheet a suspension comprising a solvent or water and a blend of a fluoroelastomer of vinylidene fluoride (VDF) with perfluoropropylene (HFP) to which PTFE is added; sintering between 330° C.–400° C.;
3) the already treated PTFE part as in point 2) is covered again with a suspension of the same fluoroelastomer of 2);
4) the substratum 1) is put into contact with the PTFE sheet treated as in 3) with the surface which has been subjected to the treatment; the system is then put in press at a temperature comprised between 150° and 200° C.

14 Claims, No Drawings

POLYTETRAFLUOROETHYLENE COUPLED ARTICLES WITH SUBSTRATA

The present invention relates to a method to adhere PTFE (polytetrafluoroethylene) to various nature substrata.

It is known that PTFE is a worldwide known plastic for its peculiar properties which make it unique in the material field. Among the various properties it is particularly appreciated its chemical inertia also at high temperatures towards very aggressive substances. To this high chemical inertia a remarkable thermal stability is combined which allows to operate in a very wide employment field, generally between −200° C. and +260° C., that is unusual in the polymer field.

PFTE, however, has no adhesion to substrata. To confer this property to PTFE various processes are known in the prior art. Generally to adhere PTFE to any substratum, it is necessary to chemically attack PTFE. Due to its exceptional chemical resistance, to be able to carry out this treatment, systems based on alkaline metals solubilized in ammonia, in tetrahydrofurane (THF), etc., are utilized. Apart from the difficulty and danger to work with these substances, the treatment is very sensitive to the application conditions and maintenance of the compound properties after storage.

An alternative to the utilization of corrosive systems consists in employing PTFE dispersions and/or other fluorinated polymers formulated with polymers thermally stable at the PTFE processing/melting temperatures, such as for instance PAI (polyamidoimides) and/or polyphenylene-sulphides (PPS). See for instance U.S. Pat. Nos. 4,252,859, 4,049,863 and 4,031,286. This solution, utilized for instance in the case of the metal coating for the cookware field, is limited to the case of systems in aqueous dispersion and very thin thicknesses, in the range of ten microns. The obtained adhesion degree, however, is not very high. Moreover, the fact to have to operate at a temperature higher than that of the PTFE melting point is not a problem in the case of metal substrata, but it represents a great limit when different substrata, for instance plastics are to be utilized.

Systems based on fluorinated solvents which swell the surface of the fluorinated polymer to be adhered, are also known. For instance, see patent application WO 96/20982 wherein reference is made to a dimer obtained from the reaction between phenanthrene and fluorine in the presence of $CoF_3$ as catalyst. The adhesion is obtained by preparing a PFA solution (tetrafluoroethylene copolymer with perfluoropropylvinylether) in the fluorinated solvent indicated above (1 h at 300–343°C.). Successively a PFA film is immersed for 1 h at 225–250° C. in said solution and then such film is put between PTFE and the chosen substratum. Also the PTFE sheet to adhere to the substratum must be immersed in the solution indicated above to obtain good results. The adhesion is obtained by pressing the various layers for 1 h at 320° C. The drawback of this process resides in that long times at high temperatures are required; moreover solvents requiring appropriate scrubber systems are utilized.

The Applicant has unexpectedly and surprisingly found a process which allows to adhere PTFE in film or sheets to metal or plastic substrata without the drawbacks of the art described above. Further optimal adhesion properties are obtained.

An object of the present invention is therefore a process allowing to adhere PTFE in film or in sheets to metal or plastic substrata comprising:

1) making the substratum surface rough by sandblasting;
2) spreading, on the film or sheet PTFE, a suspension comprising a solvent or water and a compound of a fluoroelastomer of vinylidene fluoride (VDF) with perfluoropropylene (HFP), optionally in the presence of tetrafluoroethylene (TFE), with PTFE, with a ratio fluoroelastomer/PTFE comprised between 80:20 and 20:80% by weight, preferably between 60:40 and 30:70; evaporating the solvent; sintering between 330° C.–400° C., preferably between 340° C.–380° C., in a mold, having a hollow with shape and size fit to contain the coupled (composite) substratum/PTFE for a sufficient time to sinter the material, generally comprised between 1' and 10', preferably between 1' and 5'; then cooling;
3) the already treated PTFE part as in point 2) is covered again with a suspension of the same fluoroelastomer of 2);
4) the substratum 1) is put into contact with the PTFE tape treated as in 3) with the surface subjected to the treatment; the system is then put in press at a temperature comprised between 150° and 200° C., preferably between 170° and 190° C.

Step 1) is carried out according to methods well known in the art, for instance by employing corundum, silica, etc.

As substrata the metal ones can be mentioned, for instance aluminium, steel, iron, brass, etc.; among the plastic ones can be mentioned those as such or composites, for instance based on mineral fillers, reinforcement fibers, generally glass or carbon fibres and polymeric material. Generally, the polymers or the composites must have a melting or softening point higher than 150° C., preferably higher than 190° C. These plastic materials are generally those which can find utilization as structural parts for shaft seals. It is well known that these materials must resist to temperatures higher than 150° C., and remain unchanged for long utilization time. Among the plastic materials PPS, nylon, PAI, PI (polyimide), PEEK (polyetheretherketone), etc. can be mentioned.

In point 3) the additional treatment with fluoroelastomer compound can be carried out on the substratum 1 instead of the PTFE sheet as indicated in point 2).

In point 2) before the indicated treatment, the PTFE sheet is preferably treated with a primer based on polyamidoimide and/or PPS, polyethersulphone, bismaleimides, polyimides, etc. These products are well known in the patents indicated above for cookware.

In point 4) the substratum 1, particularly in the case of metal substrata, is preferably treated with primers which ease the adhesion between the fluoroelastomer of the invention and the metal, when the fluoroelastomer is cured by peroxidic way as specified below. They are generally primers based on silanes, aminosilanes, epoxy resins, etc., for instance the commercial product called MEGUM® V 16510.

PTFE in point 2), which is added to the fluoroelastomer, can be utilized in powder in the form of aqueous latex. PTFE used has generally a molecular weight ranging from 1,000,000 to 20,000,000, preferably from 5,000,000 to 15,000,000. Also PTFE subjected to partial decomposition treatments can be utilized, for instance to obtain molecular weights comprised betwen 10,000 and 1,000,000, preferably between 100,000 and 500,000. A polymer with these characteristic can be obtained by thermal treatment of high molecular weight PTFE, or by irradiation for instance with gamma rays, or directly in polymerization by utilizing chain transfer agents. Alternatively it can be utilized PTFE filled with glass- and/or carbon-fibers, etc. in amounts comprised between 5 and 30% by weight, preferably between 15 and 25. PTFE can be utilized as homopolymer or as PTFE modified with small amounts of perfluoroalkylvinylethers, generally from 1 to 3 carbon atoms, or with hexafluoropropene, by copolymerization of TFE with the above comonomers. The comonomer amount is generally comprised between 0.05 and 0.8% by weight, preferably between 0.5 and 0.15% by weight.

The PTFE which is added to the fluoroelastomer of point 2) can also be totally or partially substituted with perfluoropolymers such as copolymers TFE/perfluoroalkylvinylethers, for instance PFA or MFA, optionally modified with perfluorodioxoles, or copolymers TFE/perfluorodioxoles, see for instance European patent 633,257.

The preparation of suspensions of point 2) is as follows: the fluoroelastomer, with the various additives as indicated above, is suspended in a solvent, for instance methylethylketone, and then PTFE is added. The solvents utilized are those dissolving the VDF-HFP fluoroelastomer, optionally comprising TFE. Ketones generally from 3 to 10 carbon atoms, for instance acetone, diethylketone, ethylisopropylketone, etc., can be mentioned. In the case of aqueous suspensions, all the other additives as indicated hereinunder are added to the mixture of the latexes of PTFE and of the fluoroelastomer of the invention.

The PTFE of the PTFE sheet, which is utilized for the treatment in point 2), can have molecular weight from 1,000,000 to 20,000,000 and not subjected to irradiation, or filled with fibers of the same type as those indicated above and/or with molibdenum sulphide; the filler amount generally ranges between 5 and 20% by weight, preferably between 5 and 10% by weight. The PTFE of the sheet can be homopolymer, or preferably PTFE modified with small amounts of perfluoroalkylvinylethers, generally from 1 to 3 carbon atoms, or with hexafluoropropene, obtainable by copolymerization of TFE with the above mentioned comonomers. The amount of comonomer is generally comprised between 0.05 and 0.8% by weight, preferably between 0.5 and 0.15% by weight.

The fluoroelastomer utilized in point 2) is prepared according to methods well known in the art, for instance see U.S. Pat. No. 4,259,463, EP 684,276 herein incorporated by reference. The VDF amount is generally comprised between 40 and 68% by weight, the HFP one from 20 to 50%, the TFE amount, when present, can reach the amount of 40% by weight.

The fluoroelastomer compound of point 2) comprises the agents necessary for the fluoroelastomers crosslinking. If the curing is of ionic type it is prepared by adding to 100 parts by weight of rubber (phr) (fluoroelastomer of the invention), from 1 to 5 parts of crosslinking agent, such as bisphenol AF, from 1 to 5 parts of accelerating agent, such as onio-organic compounds, or an adduct of the crosslinking agent with the accelerating agent in amounts from 1 to 5 phr. One or more acceptors of acids in amounts between 1 and 40 parts and one or more basic compounds in amounts between 0.5 and 10 parts (generally $Ca(OH)_2$ and MgO), are moreover present; also the fillers, for instance carbon, silica, dyes, generally in amounts between 5 and 60 phr can be present. The compounds are well known in the art, for instance in the above patents.

If the curing is of peroxidic type, the polymer generally contains iodine or bromine, in amounts generally comprised between 0.001 and 5% by weight with respect to the total weight of the polymer, and the compound is cured by peroxides, generally dialkylperoxides as diterbutylperoxides, dicumylperoxide, dibenzoylperoxide, etc.; curing coagents (generally between 0.5 and 10% by weight), for instance triallylcyanurate, triallylisocyanurate, triallylphosphite, etc.: the fillers as indicated above. See for intance European patent application 683,149.

The suspension amount in point 2) or in point 3) ranges in general from 100 to 200 microns. The composites obtainable with the process of the present invention are novel and find a particular use as shaftseals. It has been found, by experiments carried out by the Applicant, that the composites of the invention show unexpectedly an improved chemical resistance when used with oil additivated with polar compounds, e.g. alcoholes, ammines.

The composites of the prior art, e.g. those obtained by etching the PTFE sheet (alkaline metals solubilized in ammonia or THF) show a poor chemical resistance.

The following examples are given for illustrative purposes but are not limitative of the scope of the present invention.

EXAMPLES

PREPARATION OF THE SURFACE SUBSTRATA

The cast iron sheets and/or the PPS sheets (RYTON®) were sandblasted with $Al_2O_3$ (60 mesh) with a residence time in sandblasting machine of 30–40 sec. In said sandblasting machine a compressed air gun at 4 atm is utilized. In the case of cast iron (carbon steel), the sandblasting phase was followed by a methylethylketone washing.

PREPARATION OF THE COMPOUNDS

The compounds were prepared according to ASTM D 3182 standard. All the ingredients (premixed among each other) were added to the fluoroelastomer in an open mixer, and the obtained mixture homogeneized for 7–8 minutes. After 24 h of stay, the blends were homogeneized again by passing them in the mixer 6 times.

PREPARATION OF THE SUSPENSIONS

The suspensions were prepared by introducing the fluoroelastomer compound, cut in small pieces, in methylethylketone. The mixture, so obtained, was homogeneized on a jardriver for 4 h, and this time elapsed, it was charged with PTFE.

APPLICATION OF THE SUSPENSION

The suspension prepared above was applied with known techniques, preferably by using a roller, which allowed to obtain an homogeneous film with final thickness, after drying, equal to 100–200 microns.

PEEL TEST

The adhesion test were carried out, in accordance with the ASTM D413 standard, with the INSTRON® dinamometer. The test was carried out by applying a force, the value of which was constantly registered, such as to allow the separation of the adhesive-made surfaces. The separation speed of the two surfaces was fixed before the execution of the test and its value maintained constant for the whole experiment.

The number value of the adhesion was expressed in terms of instant stress measured and the determination of the result was carried out by making the average of the minimum value and the maximum value of each force curve obtained. Each value of peel test, reported in table and expressed in Newton/millimeter, was obtained by averaging the values of four tests.

For the execution of the tests cast iron and/or polyphenylensulphide sheets having the following sizes: 25 mm×60 mm×2 mm were used. For the PTFE sheets the sizes were: 25 mm×90 mm×1 mm. The separation speed of the two adhesived surfaces, during the execution of the tests, was equal to 0.08 mm/sec.

EXAMPLE 1 (comparative)
PTFE suspension in water

| Ingredients | % (by weight) |
|---|---|
| N-methylpyrrolidone | 6 |
| Triethanolamine | 2 |
| PTFE (Algoflon(R) D60 T11) | 22 |
| Polyamidoimidic resin | 5 |
| Precipitated SiO$_2$ | 2 |
| Triton(R) X 100 | 1 |
| Polyphenylensulphide | 5 |
| Furfuryl alcohol | 4 |
| H$_2$O | 53 |

The primer of which the composition is reported was spread on the PTFE sheet (homopolymer with molecular weight of 10,000,000 charged with 5% by weight of glass fibers and 5% by weight of MoS$_2$, typical composition utilized for the manufacture of shaft seals) and the obtained film dried in an oven at 50° C. for 15'. The PTFE sheet, so treated, was then sintered in a compression press at 360° C., 20 bar, for 3', with the cast iron sheet, previously sandblasted and washed with methylethylketone. The PTFE used in the dispersion was a PTFE modified for the presence in chain of 0.1% by weight of HFP. The results of the peel test are reported in the table.

EXAMPLE 2 (comparative)
Primer (solvent based)

| Ingredients | % (by weight) |
|---|---|
| Compound A | 28 |
| PTFE (Algoflon(R) L 206) | 28 |
| Methylethylketone | 44 |
| The compound A had the following composition: | |
| Fluoroelastomer TECNOFLON(R) | 100 |
| (VDF 60.9% by weight, HFP 30.1% by weight) | |
| TECNOFLON(R) FOR M1 (bisphenol AF 50%) | 4 phr |
| TECNOFLON(R) FOR M2 | 2.5 phr |
| (diphenylbenzyl-N-diethylamino phosphonium chloride 30%) | |
| TREMIN(R) 283 600 EST | 50 phr |
| (wollastonite treated with epoxysilanes) | |
| Ca(OH)$_2$ | 6 phr |
| MgO | 6 phr |
| Polyphenylsulphide | 130 phr. |

The same type of PTFE sheet of Example 1 was treated with the above primer. The procedure to obtain the coupled PTFE/metal was the same of Example 1.

The peel test results are reported in the table.

EXAMPLE 3 (comparative)

| Ingredients | % (by weight) |
|---|---|
| Primer A1 having an aqueous base of polyamidoimide and PTFE | |
| N-methylpyrrolidone | 6 |
| Triethanolamine | 2 |
| PTFE (ALGOFLON(R) D60 T11) | 25 |
| Polyamidoimidic resin | 5 |
| SiO$_2$ | 2 |
| TRITON(R) X 100 | 1 |
| Furfurylic alcohol | 4 |
| H$_2$O | 55 |

EXAMPLE 3 (comparative)

| Ingredients | % (by weight) |
|---|---|
| Primer B1 (solvent based) | |
| Compound B | 28 |
| PTFE ALGOFLON L 206 | 28 |
| Methylethylketone | 44 |
| The compound B had the following composition: | |
| Fluoroelastomer TECNOFLON(R) terpolymer | 100 phr |
| Drimix (triallylisocyanurate 75% by weight) | 5 " |
| Luperco(R) 101 XL | 2.5 " |
| (2,5-dimethyl-2,5-bis(t-butyl-peroxy)hexane 45%) | |
| Tremin(R) 283 600 est | 50 " |
| ZnO | 10 " |

The same type of PTFE sheet of Example 1 was treated, first with primer A1 and then, after drying of the obtained film in an oven at 50° C. for 15', with the primer B1. The cast iron sheet, after having been sandblasted, washed with methylethylketone and covered with a MEGUM® V 16510 film, was treated with the primer B1. The procedure to obtain the coupled metal/PTFE was the same as in Example 1.

The used fluoroelastomer TECNOFLON® terpolymer had a molecular composition (by weight) equal to 42.8% of VDF, 32.3% of HFP and 24.9% of TFE. The percentages by weight of bromine and iodine were respectively 0.40% and 0.11%. The peel test results are reported in the table.

EXAMPLE 4
Primer A1 (primer A1 of Example 3)
Primer B2 (solvent based)

| Ingredients | % (by weight) |
|---|---|
| Compound B (of example 3) | 28 |
| PTFE (ALGOFLON(R) 25 GL) | 28 |
| Methylethylketone | 44 |

The same type of PTFE sheet of Example 1 was treated, first with the primer A1 and then, after drying of the film obtained in forced ventilation oven at 50° C. for 15', with the primer B2. After drying in air of the second film, the sheet was sintered in a compression press at 360° C., 20 bar, for 3'. After cooling at room temperature, the PTFE sheet, so treated, was covered with a 50% suspension by weight of the compound B in MEK and the obtained film dried in air.

The carbon steel sheet, sandblasted and washed with methylethylketone, was covered with a thin film (100 micron) of MEGUM® V 16510. The PTFE used for preparing the suspension was a PTFE having molecular weight of about 10,000,000, filled with 25% by weight of glass fibers.

The two substrata, so treated, were then molded in a compression press at 190° C. for 3'. The peel test results are reported in the table.

EXAMPLE 5
Primer A1 (primer A1 of Example 3)
Primer B3 (solvent based)

| Ingredients | % (by weight) |
|---|---|
| Compound B (of example 3) | 28 |
| PTFE (Algoflon(R) L 206) | 28 |
| Methylethylketone | 44 |

The coupled (composite) metal/PTFE was obtained as in example 4. The PTFE used for preparing the suspension was an irradiated PTFE with average molecular weight from about 100,000 to about 500,000. The peel test results are reported in the table.

EXAMPLE 6
Primer A1 (primer A1 of Example 3)
Primer B4 (solvent based)

| Ingredients | % (by weight) |
|---|---|
| Compound B (of example 3) | 28 |
| PTFE modified (ALGOFLON(R) F3140) | 28 |
| Methylethylketone | 44 |

Methylethylketone 44

The procedure used to obtain the coupled PTFE/metal was the same as in Example 4. The PTFE used for preparing the suspension was a modified PTFE (0.1 by weight of perfluoropropylvinylether). The peel test results are reported in the table.

EXAMPLE 7
Primer 1 solvent based (primer of example 2)
Primer 2 solvent based

| Ingredients | % (by weight) |
|---|---|
| Compound C | 50 |
| Methylethylketone | 50 |
| The compound C had the following composition: | |
| TECNOFLON(R) copolymer | 100 phr |
| TECNOFLON(R) FOR M1 | 4 " |
| TECNOFLON(R) FOR M2 | 2.5 " |
| Tremin(R) 283 600 (epoxy silane treated) | 50 " |
| Ca(OH)$_2$ | 6 " |
| MgO | 3 " |

The same type of PTFE sheet of Example 1 was treated with the primer 1 and the obtained film dried in air.

As in example 4, the sheet so treated was first sintered, and, after cooling, covered with the primer 2 and then molded with the cast iron sheet, previously sandblasted and washed with methylethylketone, in a compression press at 190° C. for 8'. The TECNOFLON® copolymer and the PTFE of the primer 1 were the same as in Example 2. The peel test results are reported in the table.

Example 8

In this case the same primer and the same procedure of Example 7 were utilized. The only difference consisted in having substituted the metal substratum with a polyphenylensulphide. The peel test result is reported in the table.

Example 9

Example 4 was repeated by substituting the carbon steel sheet with a polyphenylensulphide sheet. The peel test result is reported in the table.

EXAMPLE 10
Primer water based

| Ingredients | % (by weight) |
|---|---|
| TECNOFLON(R) TERPOLYMER latex (50% by weight) | 50 |
| Luperco(R) 101 XL | 1.0 |

-continued

EXAMPLE 10
Primer water based

| Ingredients | % (by weight) |
|---|---|
| Drimix(R) | 0.8 |
| PTFE (ALGOFLON(R) D60 T11) | 47.7 |
| Fluorinated surfactant FORAFAC(R) 1110/D | 0.5. |

The same type of PTFE sheet of Example 1 was treated with the primer described above and the obtained film dried in air forced ventilation oven at 50° C. for 15'.

By utilizing the same conditions of example 4, the sheet, so treated, was first sintered in press, then treated again with the primer indicated above and then, after drying in an oven ventilated at 50° C. for 15 min., molded in a compression press with the carbon steel sheet previously sandblasted, washed with methylethylketone and covered with MEGUM® V 16510. The used fluoroelastomer had a composition equal to 43.1% by weight of VDF, 32.1% of HFP and 24.8% of TFE. The percentages by weight of bromine and iodine were respectively 0.45 and e 0.09.

The peel test result is reported in the table.

EXAMPLE 11
Primer water based

| Ingredients | % (by weight) |
|---|---|
| TECNOFLON(R) terpolymer latex (50% by weight) | 50 |
| Luperco(R) 101 XL | 0.8 |
| Drimix(R) | 1.0 |
| PTFE (Algoflon(R) D 60 T11) | 25 |
| Latex (56% weight) | 22.7 |
| (Copolymer TFE/perfluoromethylvinylether with 96.5% moles TFE) | |
| Fluorinated surfactant FORAFAC(R) 1110/D | 0.5. |

The procedure to obtain the coupled was the same as in Example 10. Also the fluoroelastomer and the PTFE were the same of Example 10. The peel test result is reported in the table.

Example 12

Example 4 was repeated by utilizing instead of PTFE homopolymer in the PTFE sheet, a TFE copolymer obtained by polymerization of TFE with propylvinylether, the amount of propylvinylether being 0.1% by weight in the final polymer.

The same procedure and the same conditions of example 4 were utilized, by carrying out, however, the sintering in press at 340° C. instead of 360° C. The peel test results are reported in the table.

TABLE

| PEEL TEST | |
|---|---|
| | ADHESIVE FORCE N/mm |
| EXAMPLE 1 (comp) | no adhesion* |
| EXAMPLE 2 (comp) | 0.4 |
| EXAMPLE 3 (comp) | 0.6 |
| EXAMPLE 4 | 1.8 |
| EXAMPLE 5 | 1.5 |
| EXAMPLE 6 | 1.9 |

TABLE-continued

PEEL TEST

| | ADHESIVE FORCE N/mm |
|---|---|
| EXAMPLE 7 | 1.0 |
| EXAMPLE 8 | 1.1 |
| EXAMPLE 9 | 1.6 |
| EXAMPLE 10 | 1.0 |
| EXAMPLE 11 | 1.5 |
| EXAMPLE 12 | 1.9 |

What is claimed is:

1. Process to adhere polytetrafluoroethylene in film or in sheets to metal or plastic substrata which comprises:
   1) roughening the substratum surface;
   2) spreading on a polytetrafluoroethylene sheet or film a suspension comprising a solvent or water and a compound of a fluoroelastomer of vinylidene fluoride (VDF) with perfluoropropylene (HFP), optionally in the presence of tetrafluoroethylene (TFE), with polytetrafluoroethylene, with a ratio fluoroelastomer/polytetrafluoroethylene comprised between 80:20 and 20:80% by weight;
   evaporating the solvent or water;
   sintering between 330° C.–400° C., for a time comprised between 1 and 10 minutes;
   then cooling;
   3) covering the polytetrafluoroethylene treated in step 2) again with a suspension of the same fluoroelastomer of 2);
   4) contacting the substratum of step 1) with the polytetrafluoroethylene sheet treated as in 3); and
   compressing the coupled substratum/polytetrafluoroethylene sheet treated as in 3) at a temperature comprised between 150° and 200° C.

2. Process to adhere polytetrafluoroethylene in films or in sheets according to claim 1, wherein in step 2) before spreading on a polytetrafluoroethylene or film the suspension, the polytetrafluoroethylene sheet is treated with a primer based on polyamidoimide and polyphenylenesulphides, polyethersulphone, bismaleimides, and polyimides.

3. Process to adhere polytetrafluoroethylene in films or in sheets according to claim 1, wherein in point 4), when the substratum 1 is a metal substrata, is treated with primers facilitating the adhesion between the fluoroelastomer and the metal, when the fluoroelastomer is cured by peroxides.

4. Process to adhere polytetrafluoroethylene in films or in sheets according to claim 3, wherein the primers are selected from silanes, aminosilanes, and epoxy resins.

5. Process to adhere polytetrafluoroethylene in films or in sheets according to claim 1, wherein the polytetrafluoroethylene in point 2) which is added to the fluoroelastomer blend, is in powder form or in the form of an aqueous latex; the polytetrafluoroethylene has a molecular weight ranging from 1,000,000 to 20,000,000; optionally polytetrafluoroethylene is subjected to treatments of partial decomposition to obtain molecular weights comprised between 10,000 and 1,000,000; optionally polytetrafluoroethylene is filled with glass and/or carbon fibers in amounts comprised between 5 and 30% by weight; the polytetrafluoroethylene optionally can be modified with small amounts of perfluoroalkylvinylethers, of from 1 to 3 carbon atoms, or with hexafluoropropene, by copolymerization of TFE with the comonomers mentioned above, the amount of comonomer being comprised between 0.05 and 0.8% by weight.

6. Process to adhere polytetrafuoroethylene in film or in sheets according to claim 5, wherein the plastic substrata, or composite based on mineral fillers, and reinforcement fibers has a melting or softening point greater than 150° C.

7. Process to adhere polytetrafluoroethylene in film or in sheets according to claim 6, wherein the plastic substrata has a melting point or softening point greater than 150° C.

8. Process to adhere polytetrafluoroethylene in film or in sheets according to claim 5, wherein polytetrafluoroethylene in step 2) added to the fluoroelastomer blend, when the polytetrafluoroethylene is utilized has molecular weight of from 5,000,000 to 15,000,000; when the polytetrafluoroethylene is subjected to treatments of partial decomposition, its molecular weights is between 100,000 and 500,000; when the polytetrafluoroethylene is filled with glass and/or carbon fibers the amounts of glass and/or carbon fibers are between 15 and 25% by weight; when the polytetrafluoroethylene can be modified with small amounts of perfluoroalkylvinylethers, of from 1 to 3 carbon atoms, or with hexafluoropropene, by copolymerization of tetrafluoroethylene with the comonomers mentioned above, the amount of comonomer is between 0.5 and 0.15% by weight.

9. Process to adhere polytetrafluoroethylene in films or in sheets according to claim 1, wherein the polytetrafluoroethylene of the polytetrafluoroethylene sheet which is utilized for the treatment in point step 2), has a molecular weight from 1,000,000 to 20,000,000 and not subjected to irradiation, or filled with glass and/or carbon fibers and/or with molybdenum sulphide; the amounts range between 5 and 20% by weight; the polytetrafluoroethylene of the sheet is homopolymer, or modified polytetrafluoroethylene with small amounts of perfluoroalkylvinylethers, from 1 to 3 carbon atoms, or with hexafluoropropene, by copolymerization of TFE with the above mentioned comonomers, the amount of comonomer is comprised between 0.05 and 0.8% by weight.

10. Process to adhere polytetrafluoroethylene in film or in sheets according to claim 9, wherein the polytetrafluoroethylene filled with glass and/or carbon fibers and/or with molybdenum sulphide, the amounts are between 5 and 10% by weight; when polytetrafluoroethylene can be modified with small amounts of perfluoroalkylvinylethers, from 1 to 3 carbon atoms, or with hexafluoropropene, by copolymerization of tetrafluoroethylene with the comonomers mentioned above, the amount of comonomer being between 0.6 and 0.15% by weight.

11. Process to adhere polytetrafluoroethylene in films or in sheets according to claim 1, wherein the fluoroelastomer comprises amounts of vinylidene fluoride between 40 and 68% by weight, perfluoropropylene from 20 to 50%, and optionally tetrafluoroethylene in amounts up to 40% by weight.

12. Process to adhere polytetrafluoroethylene in films or in sheets according to claim 1, wherein the curing is ionic and/or peroxidic.

13. Process according to claim 1 wherein in step 2) the ratio of fluoroelastomer/polytetrafluoroethylene is comprised between 60:40 and 30:70 by moles, the sintering is between 340°–380° C. for a time between 1 and 5 minutes and in step 4) the temperature is comprise between 170° and 190° C.

14. Process to adhere polytetrafluoroethylene in films or in sheets to metal or plastic substrata which comprises:

1) roughening the substratum surface;
2) spreading on a polytetrafluoroethylene sheet or film a suspension comprising a solvent or water and a compound of a fluoroelastomer of vinylidene fluoride (VDF) with perfluoropropylene, optionally in the presence of tetrafluoroethylene, with polytetrafluoroethylene, with a ratio fluoroelastomer/polytetrafluoroethylene between 80:20 and 20:80% by weight;

evaporating the solvent or water;

sintering between 330° C.–400° C., for a time comprised between 1 and 10 minutes;

then cooling;

3) covering the substratum surface with a suspension of the same fluoroelastomer of 2);
4) contacting the substratum 1) with the polytetrafluoroethylene sheet treated as in 3; compressing the coupled substratum/polytetrafluoroethylene sheet treated as in 3) at a temperature between 150° and 200° C.

* * * * *